United States Patent [19]

Suzuki et al.

[11] Patent Number: 4,612,656
[45] Date of Patent: Sep. 16, 1986

[54] DIGITAL INDICATION TYPE MEASURING APPARATUS

[75] Inventors: Mikio Suzuki; Toshiyuki Matsumoto, both of Kawasaki, Japan

[73] Assignee: Mitutoyo Mfg. Co., Ltd., Tokyo, Japan

[21] Appl. No.: 578,893

[22] Filed: Feb. 10, 1984

[30] Foreign Application Priority Data

Feb. 16, 1983 [JP] Japan .................. 58-21108[U]

[51] Int. Cl.⁴ .............................................. G01B 3/20
[52] U.S. Cl. .................................. 377/24; 33/143 L; 33/147 N
[58] Field of Search ............. 377/24; 33/1 D, 143 M, 33/143 L, 147 L, 147 T, 147 J, 147 N

[56] References Cited

U.S. PATENT DOCUMENTS

| | | | |
|---|---|---|---|
| 2,989,690 | 6/1961 | Cook | 33/147 N |
| 4,112,355 | 9/1978 | Gibson et al. | 33/143 L |
| 4,205,449 | 6/1980 | Waszmer | 33/147 N |
| 4,229,883 | 10/1980 | Kobashi | 33/147 L |
| 4,255,861 | 3/1981 | Nakata et al. | 377/24 |
| 4,262,193 | 4/1981 | Ozawa | 377/24 |
| 4,457,072 | 7/1984 | Andersen | 33/143 L |

FOREIGN PATENT DOCUMENTS 177030  4/1984  Japan .................. 33/143 L

Primary Examiner—John S. Heyman
Assistant Examiner—Karl Ohralik
Attorney, Agent, or Firm—Flynn, Thiel, Boutell & Tanis

[57] ABSTRACT

The present invention relates to a digital indication type measuring apparatus comprising a main body of the measuring instrument such as slide calipers, incorporating therein a data processing circuit for digitally indicating measured data and a printer detachably connected to the main body of the measuring instrument. The connection between the main body of the measuring instrument and the printer is effected by a jack provided on the main body of the measuring instrument and a connector provided at the forward end of a cord extending from the printer. A switch for outputting the measured data to the printer is provided on the connector, whereby it becomes possible to use the main body of the measuring instrument such as the slide calipers as a single component or to print the measured data as necessary, so that the functional effect of the measuring instrument can be expanded.

5 Claims, 3 Drawing Figures

DIGITAL INDICATION TYPE MEASURING APPARATUS

BACKGROUND OF THE INVENTION

1. Field of the Invention

This invention relates to a digital indication type measuring apparatus.

2. Description of the Prior Art

There has heretofore been known a measuring instrument, in which a photoelectric or electromagnetic type encoder is connected to a so-called contact type measuring instrument for measuring a dimension of a workpiece from a displacement value of a spindle, etc. in a micrometer, slide calipers, dial gauge or the like, to thereby digitally indicate the dimension of the workpiece. The measuring instrument of the type described has been utilized in many fields because of its own characteristics of high accuracy and easy reading. Moreover, the morphological characteristics, particularly, one hand controllability greatly contributes to the wide utilization. As a consequence, for a measuring instrument of this type, compact and light-weight design are important design factors.

In general, in contrast to the tendency of miniatuarization of electronic circuit parts and the like, control parts such as a power source switch and a zero clear button need to have predetermined sizes as viewed from human engineering, and are limited in their locations to a considerable extent. For this reason, in the conventional measuring instrument, the limitation in the number of the control parts frequently necessitates lowered funtional effect and controllability, or electronic circuits complicated beyond necessity.

For example, with the digital indication type micrometer, slide calipers and the like, there are such cases where it is desirable that any one of these measuring instruments be connected to an external component for the recording of measured values except when used singly. In such cases, when a switch for data output is to be provided on the main body of the measuring instrument, a space should be secured for disposing a multiplicity of control parts each having a size of a predetermined value or more, whereby the measuring instrument becomes large-sized as a whole, the aforesaid compactness in size cannot be attained, handling is troublesome, and mistaken operations tend to occur. However, if the switch for data output is provided on the external component, then inconvenience occurs in handling. As a consequence, when the expanded functional effect is desired, it is very difficult to satisfy both requirements of compactness in size and ease of controllability of the main body of the measuring instrument.

SUMMARY OF THE INVENTION

The present invention has been developed in view of the particular characteristics of the measuring instrument and has as its object the provision of a digital indication type measuring apparatus in which the functional effect is exapanded without hampering morphological characteristics and easy controllability of the main body of the measuring instrument.

To this end, the present invention contemplates that, in a digital indication type measuring apparatus, in which a main body of the measuring instrument is integrally provided with a data processing circuit for detecting a displacement value of a measuring element as an electrical signal and digitally indicating the measured data thus detected, the main body of the measuring instrument is provided with an output terminal connected to the data processing circuit, an output component is provided which has a connector detachable from the output terminal and the connector is provided with a switch for outputting the measured data from the data processing circuit to the output component. In short, with such an arrangement that the output component can be selectively connected to the main body of the measuring instrument, the function of the measuring instrument is improved, when the measuring instrument is singly used, the switch is removed from the main body of the measuring instrument, and when the output component is connected to the measuring instrument, the switch is positioned on the side of the main body of the measuring instrument, so that both requirements of compactness in size and of ease in controllability can be satisfied.

DETAILED DESCRIPTION OF THE PREFERRED EMBODIMENT

Figure 1:
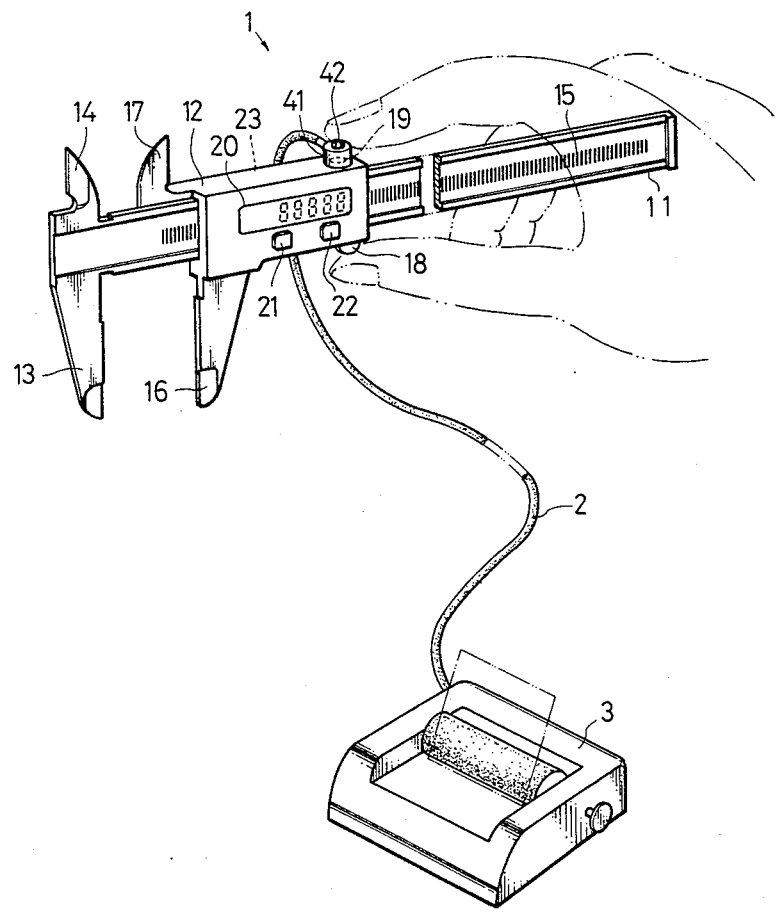
FIG. 1 is a perspective view showing one embodiment of the present invention.

Description will hereunder be given of one embodiment of the present invention with reference to the drawings. FIG. 1 shows the general arrangement of the digital indication type measuring apparatus of this embodiment. This measuring apparatus comprises slide calipers 1 and a printer 3 selectivity connected to the slide calipers 1 through a connecting cable 2.

The slide calipers 1 include a slider 12 slidable on a main scale 11 in the longitudinal direction. The main scale 11 is integrally provided at the lower edge of one end thereof with a jaw 13 for measuring on external dimension and at the upper edge of the same end thereof with a jaw 14 for measuring an internal dimension. Further, the main scale 11 is provided on the outer surface thereof with a magnetic scale 15 magnetized at regular pitches in the longitudinal direction. On the other hand, the slider 12 is integrally provided at the lower edge of one end thereof with a jaw 16 for measuring the external dimension to clamp the outer sides of the workpiece in cooperation with jaw 13 of the main scale 11. The slider 12 also has on the upper edge of the same end thereof a jaw 17 for measuring the internal dimension by contact with the inner sides of the workpiece in cooperation with the jaw 14 of the main scale 11. The slider also has at the lower edge of the other end thereof a finger grip 18 projecting downward in a semi-circular fashion, and on the surface opposite to this finger grip 18 an output terminal jack 19 is provided. Furthermore, the slider 12 is provided at the outer surface thereof with a digital indicator 20 of five places, consisting of seven segment indicating elements, a power source switch 21 and a zero clear switch 22. Further, the slider 12 incorporates therein a data processing circuit 23 for detecting a magnetic variation of the magnetic scale 15 as an electrical signal when the slider 12 is moved in the longitudinal direction of the main scale 11 with the power source switch 21 being turned on, indicating the measured data obtained through the process of the electrical signal in the digital indicator 20, outputting the measured data to the printer 3 through the jack 19 and the connecting cable 2, and clearing the measured data to zero when the zero clear switch 22 is operated.

Figure 2:
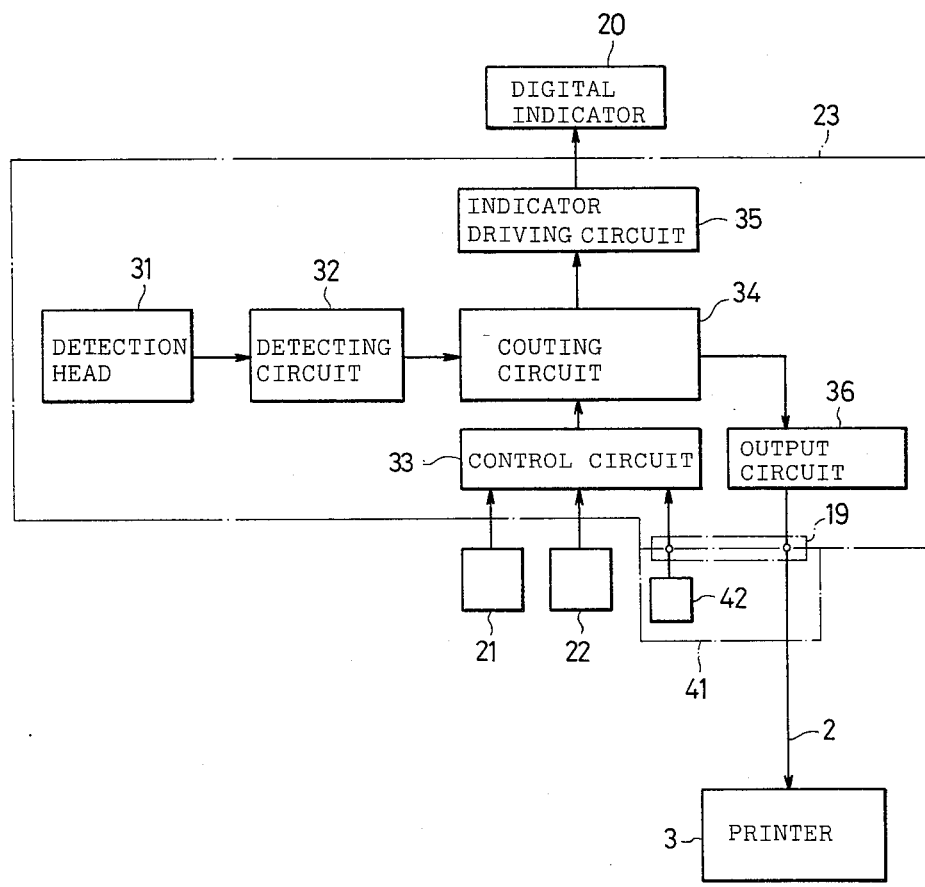
FIG. 2 is a block diagram showing the circuit arrangement thereof.

As shown in FIG. 2, the data processing circuit 23 comprises: a detection head 31 for detecting a magnetic variation of the magnetic scale 15 as an electrical signal; a detecting circuit 32 for waveform shaping an output signal from the detection head 31 to convert the same into pulse signals; a counting circuit 34 for calculating the pulse signals in accordance with a command from the control circuit 33 to seek a dimension between the jaws 13 and 16 for measuring an external dimension or a dimension between the jaws 14 and 17 for measuring an internal dimension; an indicator driving circuit 35 for indicating the measured data calculated in this counting circuit 34 in the indicator 20; and an output circuit 36 for outputting the measured data calculated in the counting circuit 34 to the printer 3. The control circuit 33 controls the operation of the counting circuit 34 when the power source switch 21 is turned on, indicates the measured data calculated in the counting circuit 34 in the digital indicator 20 through the indicator driving circuit 35, and feeds the measured data of the counting circuit 34 to the printer 3 through the output circuit 36 when a data output command due to the operation of a data output switch 42 to be described hereunder is given. Furthermore, when the zero clear switch 22 is operated, the measured data of the counting circuit 34 is cleared to zero.

On the other hand, a connector 41 is provided at the forward end of the connecting cable 2 of the printer 3, the connector 41 being a connecting means detachably connected to the jack 19 and outputting the measured data from the counting circuit 34 to the printer 3 through the connecting cable 2 when connected to the jack 19. The connector 41 is provided with a data output switch 42 for feeding a data output command to the control circuit 33 of the data processing circuit 23.

Description will hereunder be given of the operation of this embodiment. Firstly, in the state where the printer 3 is connected to the slide calipers 1 through the connecting cable 2, when the slider 12 of the slide calipers 1 is caused to slide on the main scale 11 in accordance with a dimension of the workpiece, a sinusoidal wave signal corresponding to a magnetic variation of the magnetic scale 15 is fed from the detection head 31 to the detection circuit 32. The signal fed to the detecting circuit 32 is waveform shaped, thereafter converted into pulse signals and sent to the counting circuit 34. Then, in the counting circuit 34, the pulse signals from the detecting circuit 32 are counted, and the measured data based on the counted number, i.e., a distance between the jaws 13 and 16 for measuring the external dimansion or a distance between the jaws 14 and 17 for measuring the internal dimansion is successively indicated in the digital indicator 20 through the indicator driving circuit 35. In consequence, when the jaws 13 and 16 for measuring the external dimension are brought into contact with the outer sides of the workpiece or the jaws 14 and 17 for measuring the internal dimension are brought into contact with the inner sides of the workpiece, a dimension of the outer sides or inner sides of the workpiece is digitally indicated in the digital indicator 20, so that the dimension of the workpiece can be read with high accuracy and easiness. Here, when the data output switch 42 is operated, the measured data fed from the counting circuit 34 and indicated in the digital circuit 20 is sent to the printer 3 through the output circuit 36 and the connecting cable 2, and printed out by the printer 3. In consequence, the measured data digitally indicated in the digital indicator 20 can be selectively recorded by the digital indicator 20.

On the other hand, when there is no need to record the measured data, if the slide calipers 1 is used with the connector 41 being removed from the jack 19 and the slide calipers 1 being separated from the printer 3, then the slide calipers 1 can be used in the same manner as the conventional digital indication type one. In this case, the connector 41 and the data output switch are separated from the slide calipers 1, whereby the slide calipers 1 as a single component can be rendered compact in size and light in weight and controllability is not hampered.

In consequence, according to this embodiment, the printer 3 can be selectively connected to the digital indication type slide calipers 1 through the connecting cable 2, and consequently, if the printer 3 is connected to the slide calipers 1 as necessary, the measured data digitally indicated can be printed by the printer 3, so that the functional effect of the measuring instrument can be expanded.

Particularly, in this embodiment, the jack 19 is provided on the slide calipers 1, the connector 41 provided at the forward end of the connecting cable 2 of the printer 3 is detachably connected to this jack 19, and the data output switch 42 is provided on the connector 41, so that the slide calipers 1 can be used as a single component with the connector 41 being detached from the jack 19. Moreover, when the slide calipers 1 is used as the single component, the slide calipers 1 is separated from the connector 41 and the data output switch 42, so that the slide calipers 1 as a single component can be rendered compact in size and light in weight and the controllability cannot be hampered because of eliminating the possiblity of mistaken operation of the switch and the like.

Furthermore, the jack 19 is provided on a surface opposite to the finger grip 18 of the slider 12, whereby, as indicated by chain lines in FIG. 1, with the slide calipers 1 being grasped by one hand and the thumb contacting the finger grip 18, the slider 12 can be slided to do measuring, and the data output switch 42 can be operated by the index finger when the measured data are outputted, so that one hand operation can be readily performed.

Figure 3:
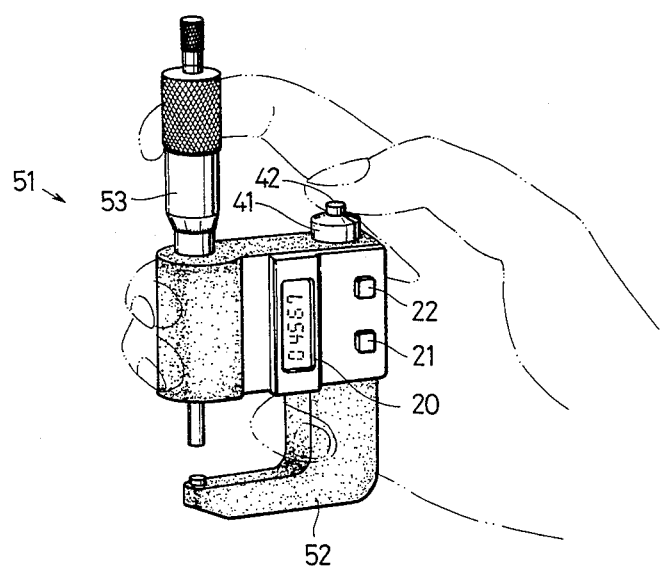
FIG. 3 is a perspective view showing one modification.

Additionally, the measuring instrument such as a micrometer or a dial gauge may be used in place of the slide calipers 1 as described in the above embodiment. For example, in the case of the micrometer, as shown in FIG. 3, the connector 41 having the data output switch 42 is secured to an end face of a U-shaped body frame 52 of the micrometer, to which a sleeve 53 is mounted, so that one hand operation can be easily performed.

Furthermore, as the means for detecting displacement values of these measuring instruments, the means of various types including a photoelectric type, an electric capacity type, a contact point type, a resistor type, a laser type and the like may be used in place of the magnetic scale type one as described in the above embodiment. Further, as the output component, for example, a cathode ray tube or the like may be used in place of the printer 3 as described in the above embodiment.

As has been described hereinabove, the present invention can provide the digital indication type measuring apparatus, in which the functional effect can be expanded without hampering the morphological characteristics and the easy controllability of the main body of the measuring instrument.

What is claimed is:

1. In a digital indication type measuring instrument which is compact in size and is portable, said measuring instrument having scale means and a slider means movably mounted on said scale means, a data processing circuit means and a digital display means provided on said slider means and movable therewith, the improvement comprising wherein said slider means has a body and an electrical jack means connected in electrical circuit to said data processing circuit means; and wherein a connector means is adapted to be detachably mounted on said electrical jack means, said connector means including an elongated cable and a body part secured to one end of said cable, the other end of said cable being connected in circuit with a recording means separate from said scale means and said slider means, said body part having a data output switch means thereon easily operable by a finger of a user of said measuring instrument for providing a data output command to said data processing circuit means upon operation thereof to effect the selected transference of data in said data processing circuit means and displayed on said digital display means to said recording means, a removal of said body part and said data output switch means thereon from said electrical jack means for purposes of detaching said recording means from connection with said data processing circuit means still enabling a reading of said data in said data processing circuit means on said digital display means.

2. The measuring instrument according to claim 1, wherein said data processing circuit means includes a detection head for detecting a variation in the position of said slider means relative to said scale means and providing a data signal, a detecting circuit connected in circuit with said detection head for providing a pulsed output signal in response to said data signal from said detection head, a counting circuit connected in circuit with said detecting circuit for counting said pulsed output signals, an indicator driving circuit for indicating the counted pulse output signal data on said digital display means, an output circuit for enabling an outputting of said data to said electrical jack means, and control circuit means responsive to an activation of said data output switch means for sending of said data to said electrical jack means.

3. The measuring instrument as set forth in claim 1, wherein one side of said main body of said slider means has a finger grip protruding therefrom which, when gripped, facilitates sliding of said slider means along the length of said scale means; and wherein another side of said main body has said electrical jack means, said data output switch means being a push button switch, said push button switch being spaced from said finger grip when said body part is mounted on said electrical jack means so that the operator's index finger can be easily placed on said push button switch and the thumb on said finger grip.

4. A measuring instrument as set forth in claim 2, wherein said electrical jack means is provided on said main body part and in a manner not protruding from an outer surface of said main body.

5. A measuring instrument as set forth in claim 2, wherein said connector means includes a plug-shaped connector on said body part.

* * * * *